United States Patent Office 3,697,482
Patented Oct. 10, 1972

3,697,482
HEAT CURABLE RESINS PREPARED FROM PHENOL, FORMALDEHYDE, DIMETHYLOL-PROPIONIC ACID AND AN ALKANOLAMINE
Jerry H. Hunsucker, 7098 Williamsburg Lane, Terre Haute, Ind. 47802
No Drawing. Continuation-in-part of application Ser. No. 36,678, May 12, 1970. This application Apr. 7, 1971, Ser. No. 132,225
Int. Cl. C08g 5/18
U.S. Cl. 260—58
4 Claims

ABSTRACT OF THE DISCLOSURE

Resin compositions suitable for baked coatings consisting of the condensation product of dimethylolpropionic acid (DMPA), with a lower aliphatic aldehyde and a compound selected from the group consisting of phenol, alkyl phenol, an alkanolamine or mixtures thereof. A method is provided for coating paper with the composition.

CROSS-REFERENCE TO RELATED APPLICATIONS

This application is a continuation-in-part of copending application Ser. No. 36,678 filed May 12, 1970, now abandoned.

BACKGROUND OF THE INVENTION

This invention relates to heat-curable resins. In a particular aspect, this invention relates to heat-curable resins suitable for baked finishes.

Urea-formaldehyde and phenol-formaldehyde resins have been known for many years and many modifications thereof have been disclosed. For example, A. J. Malashevitz et al., U.S. Pat. 3,033,823, disclosed resins modified by a methylol aminomethane.

Coatings based on urea-formaldehyde and phenol-formaldehyde resins have many uses, such as in baking compositions for paper and for metal. Paper coatings in general should be water-white, or nearly so, so that the resin will neither contribute color to the paper nor interfere with the colors of dyes and pigments. One important application for paper coatings is in the manufacture of air filter paper, such as used in air filters for carburetors, and filter papers for diverse applications such as for filtering water, petroleum products, organic solvents, etc. A desirable coating in this use should contribute good oil resistance and good water resistance. The coated paper should be stiff but not brittle. It is most important that the paper not be clogged but that it remain porous to the passage of air, water and other liquids.

Paper coatings based on urea-formaldehyde resins have been very successful but they have previously suffered from the disadvantage of releasing formaldehyde during the baking step. Formaldehyde vapors are highly irritating and disagreeable and hence it is important to maintain the concentration to as low a level as possible. Furthermore, although these previous coatings have contributed fairly good water-resistance, a need exists for improved coatings in this respect.

SUMMARY OF THE INVENTION

It is an object of this invention to provide improved heat-curable resins.

It is another object of this invention to provide improved heat-curable resins suitable for baked finishes.

It is a third object of this invention to provide improved resin compositions which do not yield formaldehyde vapors during the curing step.

It is still yet another object of this invention to provide paper coatings which provide good oil resistance and good water resistance.

It is a fifth object of this invention to provide heat-curable resins suitable for use in metal finishes.

It is yet another object of this invention to provide a process for an improved coated paper.

Other objects of this invention will be apparent to those skilled in the art from the description herein.

It is the discovery of this invention to provide a heat-curable resin composition, and a process for the preparation thereof, comprising the condensation product of 2,2-bis(hydroxymethyl)propionic acid (otherwise known as dimethylolpropionic acid, and hereinafter designated DMPA) with an aliphatic aldehyde and a member selected from the group consisting of urea, phenol, alkyl phenol, an alkanolamine and mixtures thereof. Such compositions have especial utility in paper coating compositions and in metal finishes.

DETAILED DISCUSSION

According to the present invention, DMPA is reacted with urea and an aliphatic aldehyde in the presence of a suitable solvent such as water or a lower aliphatic alcohol at reflux temperature of about 55° to about 100° C., preferably about 100° C., and at a pH of about 7.0 or below, and for a period of time sufficient to effect partial, but not complete, polymerization. In a preferred embodiment, the reaction is effected in the presence of an alkanolamine corresponding to the formula

wherein R and $R^1$ can be hydrogen, methyl, or ethyl and can be the same or different, or R, preferably, can be hydroxymethyl, in mole ratio of about 1:1 of urea.

When the reaction is complete, the reaction mixture is allowed to cool. The pH is generally about 5 and the product can be used as is. Preferably—though not necessarily—the pH is adjusted to within about 5 to 8, preferably within about 6 to 7, with an alkanolamine corresponding to the above formula, or with an alkyl amine corresponding to the formula

where $R^2$ is hydrogen and $R^3$ and $R^4$ can be hydrogen, methyl, ethyl, propyl, isopropyl, and butyl and can be the same or different. It is known in the art to adjust the pH of resin dispersions with an alkylamine or secondary or tertiary alkanolamine and any of the amine compounds previously employed can be employed to produce the dispersions of the present invention. Preferably, however, the preferred alkanolamines for adjusting the pH are those corresponding to the foregoing Formula I wherein R is hydroxymethyl. Also, the compound tris(hydroxymethyl)aminomethane is a preferred alkanolamine.

The resin dispersion so obtained is in concentrated form suitable for storage and shipping. A more concentrated product can be obtained, when desired, by distilling a suitable amount of solvent, e.g. the lower aliphatic alcohols or water, used for preparation of the resin. The distilling step is easily effected without adverse effect on the resin.

The term dispersion as used herein is intended to have its usual meaning, namely, a system of minute particles distinct and separate from one another and suspended in a liquid medium. As used herein, the term dispersion is intended to include true solutions as well as colloidal solutions, and it is not intended that the invention be limited thereby.

When pH adjustment has been effected, as hereinbefore set forth, the resin solution can be stored before use or can be used promptly. In either case, before use, the dispersion is diluted with a suitable solvent such as water or a lower aliphatic alcohol, preferably water, to a suitable concentration, e.g. about 20% by weight, as desired and dyes or pigments, etc. are added as, or if, desired. The resulting composition rapidly cures, i.e. completely polymerizes, at elevated temperatures, e.g. from 300 to 400° F., and is suitable for use as a paper coating or for a baking enamel on metal, e.g. steel. Paper coated with this material is oil and water resistant, is stiff but not brittle and remains porous to the passage of air. There is no significant odor of formaldehyde during the heat-curing step.

The urea and aldehyde are generally employed in a mole ratio of, for example, about 1:2 respectively as is known in the art. The ratios are not critical and wide departures from the foregoing are permissible. The DMPA is generally employed in a ratio of about 0.5–1.5 moles of DMPA to 2 moles of urea, preferably about 1:2. The DMPA preferably is not employed at ratios higher than 1.5:2 because the mixture may gel and become unusable. When the reaction is effected in the presence of an alkanolamine, as set forth hereinbefore, the alkanolamine is employed in a mole ratio of about 1:1 of urea. Suitable alkanolamines include, but are not limited to, 2-amino-2-methyl-1-propanol, 2-amino-1-butanol, 2-amino-2-methyl-1,3-propanediol, and 2-amino-2-ethyl-1,3-propanediol.

The reaction mixture is maintained at a pH of about 7 or below, preferably within about 5–7. A pH between 5.0 and 6.0 is particularly preferred. The acidic pH is provided by the DMPA and when the reaction is conducted in the presence of an alkanolamine, care must be taken to employ sufficient DMPA to provide a pH of 7 or below.

In describing that the paper is coated with the resinous material, it is not intended to imply that the coating resides solely on the surface. Obviously the paper absorbs the coating to a greater or lesser extent.

In another embodiment of this invention DMPA is reacted in an acidic medium with phenol, or with a mixture of phenol and alkylated phenol, and an aliphatic aldehyde. After the reaction is effected, the pH is adjusted as hereinbefore described and the dispersion is diluted to a suitable concentration. The composition of this embodiment is particularly suitable for use as a baking enamel on steel. It cures rapidly at elevated temperatures and there is no significant odor of formaldehyde during the heat-curing step.

The formaldehyde and phenol can be employed in any of the proportions known in the art. Generally, however, they are employed in approximately a 1:1 mole ratio, but the amounts are not critical. The DMPA is employed in a mole ratio of about 0.5 to 1.5 per 2 moles of phenol, preferably about 1:2. Alkyl phenol is used to replace a portion of the phenol when desired, as is known in the art.

The DMPA, alkanolamines and phenols used in the practice of this invention are commercially available and the usual commercial grades are suitable for preparing the present compositions.

Aldehydes suitable for use in preparing the compositions of the present invention include, but are not limited to, the lower aliphatic aldehydes, e.g. formaldehyde, acetaldehyde, propionaldehyde, and butyraldehyde. These aldehydes are commercially available and the usual commercial grades are suitable for the practice of this invention. The formaldehyde can be used as the usual 37% by weight grade or the 44% or higher grades are also suitable, as are the alkanol solutions and paraformaldehyde.

The resins of the present invention have numerous uses in addition to the preparation of high wet strength filter papers. For example they are useful as core oils in the preparation of molds for sand castings and as cross-linking agents for alkyd-, epoxy- and other hydroxy-functional resins. They are also useful for contributing wrinkle resistance to textiles and for providing shrinkage resistance to textiles.

Formaldehyde vapors have long been a problem where formaldehyde-based thermosetting prepolymers and resins are employed. The problem is especially acute in textile-treating processes and in laminating processes. Troublesome textile treating processes include the crease-proofing process wherein textiles are treated with urea formaldehyde and substituted urea-formaldehyde adducts, including the triazones, the pyrimidinones, and triazines. Generally, these formaldehyde-containing prepolymers are applied in aqueous solution to textiles, and the treated textile is then heated to about 250–350° F., as is known, to set the resin. During this heating step considerable formaldehyde vapors may be emitted, thus creating an obnoxious environmental pollutant.

Similarly, in laminating paper, wood and the like where formaldehyde-based prepolymers are used as the adhesive, serious problems arise from formaldehyde vapors in the atmosphere.

It is an embodiment of the present invention to provide a method of eliminating these formaldehyde vapors and thereby solve a troublesome problem.

As described hereinbefore, alkanolamines are useful for adjusting the pH of the resin dispersions of the present invention to within 5 to about 8. It is a discovery of the present invention that the addition of an alkanolamine corresponding to the formula

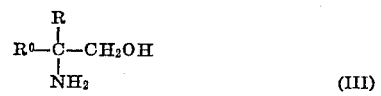

(III)

where $R^0$ can be hydrogen, alkyl of 1 to about 6 carbon atoms, or hydroxymethyl and R can be hydrogen, methyl, ethyl or hydroxymethyl, to a dispersion of a formaldehyde-based resin substantially eliminates formaldehyde vapors during subsequent heating. The amount of alkanolamine is not critical. Generally an amount sufficient to raise the pH to within about 6 to 8 is adequate.

In addition to the alkanolamines set forth hereinbefore, the present embodiment also contemplates the use of alkanolamines including but not limited to monoethanolamine; 2-amino-1-pentanol; 2-amino-1-hexanol; 2-amino-1-octanol; and 2-amino-1-decanol.

The primary alkanolamines of the present invention can be used with any compatible, non-volatile, acid curable textile crease-proofing agent obtained by reacting, or partially reacting urea or a substituted urea and formaldehyde. In this application the term "compatible, non-volatile, acid curable textile crease-proofing agent" is defined as a urea-formaldehyde textile crease-proofing agent which is curable at elevated temperatures by an acidic substance or a substance providing acidity, and which is not cured in the absence of catalyst at temperatures typically used in drying textiles. Examples of such crease-proofing agents include monoheterocyclic ureas of the general formula

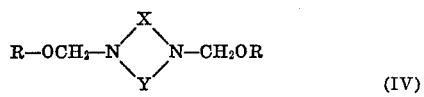

wherein R is a radical selected from the group consisting of lower alkyl or hydrogen, X is a radical selected from the group consisting of

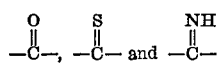

and Y is a radical selected from the group consisting of —CH$_2$—CH$_2$—, —CH$_2$—CH$_2$—CH$_2$—, —CH$_2$OCH$_2$— and

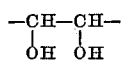

for example dimethylol ethylene urea, dimethylol urea, dimethylol-1,3-propylene urea, bis(methoxymethyl)uron; the triazones such as 1,3 - bis(hydroxymethyl)tetrahydro-5 - ethyl - 2 - triazone, and 1,3 - bis(hydroxymethyl)tetrahydro - 5 - propyl - 2 - triazone; the pyrimidinones such as 1,3 - bis(hydroxymethyl) - tetrahydro - 2 - pyrimidinone; 1,3 - bis(hydroxymethyl)tetrahydro - 5 - methyl-2 - pyrimidinone and 1,3 - bis(hydroxymethyl)tetrahydro-5-hydroxy-2-pyrimidinone and the like. Further examples include the diheterocyclic ureas of the general formula

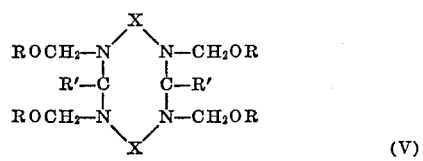

wherein R is a radical selected from the group consisting of hydrogen and lower alkyl, R' is a radical selected from the group consisting of hydrogen, methyl and benzyl and X is a radical selected from the group consisting of —CH$_2$—CH$_2$—, —CH$_2$—CH$_2$—CH$_2$—, —CH$_2$OCH$_2$—, and

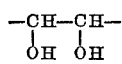

for example tetramethylol acetylene diurea, tetramethoxymethyl dimethyl acetylene diurea, trimethylol methyl acetylene diurea and the like. Other examples are the triazines of the general formula

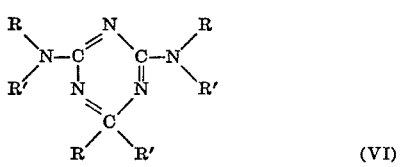

wherein R is hydrogen, lower alkyl, —CH$_2$OH or —CH$_2$OR$^2$, R' is a radical selected from the group consisting of —CH$_2$OH and —CH$_2$OR$^2$ and R$^2$ is an alkyl radical for example tris(methoxymethyl)melamine, hexamethoxymethylmelamine, tetramethoxymethylacetoguanamine and the like.

The amount of crease-proofing agent applied to fabrics in general may vary over a wide range and will depend among other things on the type of fabric and on the type of garment into which the fabric will be made. It is essential, of course, that the amount be sufficient to crease-proof the fabric. Typically, from about 1% to about 20% by weight of crease-proofing agent solids based on the weight of the fabric is applied to the fabric. Amounts of from 8 to 12% are preferred.

The amount of alkanolamine to be employed varies somewhat depending on the amount of free formaldehyde present in the crease-proofing agent. Generally from 1 to 3% is adequate. Preferably the amount added is insufficient to raise the pH above 7.0. A pH of 6.8 has been found advantageous. Particularly preferred amount is the stoichiometric amount based on the amount of free formaldehyde present in the crease-proofing agent preparation. The amount of free formaldehyde can be determined by any suitable method, many of which are known.

Heat-curable preparations of urea-formaldehyde prepolymers and substituted ureas with formaldehyde, as hereinbefore set forth, are also used in laminating paper, wood and the like as is known in the art. The process of preventing formaldehyde vapors in laminating processes where such adhesives are used can be carried out in a manner like that of treating textiles, i.e. by incorporating in said adhesive from 1–3% by weight of alkanolamine based on the solids content of the adhesive, or preferably a stoichiometric amount based on the free formaldehyde content is added thereto.

Various thermosetting phenolic-formaldehyde prepolymers are also used as heat-curable adhesives in laminating paper, wood and the like, as is known in the art. These preparations also emit formaldehyde vapors in noxious amounts during the laminating process. The inclusion of 1–3% by weight, based on the solids content of the adhesive, of an alkanolamine as previously described will eliminate the formaldehyde vapors; or preferably the amount of free formaldehyde present in the preparation is determined by any suitable method and a stoichiometric equivalent amount of alkanolamine is added.

The term "stoichiometric amount" as used herein is intended to mean the theoretical amount of alkanolamine which reacts with formaldehyde. When the alkanolamine is an amino-monoalkanol, it reacts with formaldehyde in a 1:1 mole ratio. Amino-alkanediols and amino-alkanetriols react in a mole ratio of 2 of formaldehyde to 1 of amino compound.

Phenolic-formaldehyde prepolymers which can be benefited by adding the alkanolamines of the present invention include but are not limited to prepolymers of formaldehyde with phenol itself; with the alkyl, alkenyl and aryl phenols; with the dihydric phenols and with the polyphenols. Examples of alkyl, alkenyl and aryl phenols used with formaldehyde as heat-curable adhesives include o-, m-, and p-cresol; the xylenols and p-tert. butyl phenol; p- and o-di- and tributenyl phenols; and p-phenyl phenol. Examples of dihydric phenols include resorcinol, hydroquinone and catechol. An example of polyphenols is 2,2'-bis(hydroxyphenyl)propane.

The term prepolymer as used herein is intended to mean compounds or mixtures of compounds which form polymers under polymerizing conditions, e.g. at elevated temperatures, but are not necessarily polymeric themselves.

The foregoing description of the invention can be better understood with reference to the following examples. It is understood, however, that the examples are for the purpose of illustration and it is not intended to be limited thereby.

EXAMPLE 1

Urea, 60 g. (1 mole), and formaldehyde, 61 g. (about 2 mole, provided by 165 g. of a 37% solution) and isopropyl alcohol, about 30 g., were charged to a reaction vessel equipped with a thermometer, stirrer and reflux distillation column. The mixture was stirred until the urea dissolved, then DMPA, 134 g. (about 1 mole), was added. The mixture was heated at reflux for 2 hours. It was then cooled and the pH was adjusted with 2-amino-2-methyl-1-propanol to about 6.0. The product was a water-white resin dispersed in aqueous isopropyl alcohol solution. The viscosity was J, Gardner. The resin solution was diluted to 20% by weight with isopropyl alcohol. A sample of uncoated air filter paper was dipped therein. Excess solution was removed by passing the paper through a roller press. It was then baked at about 190° C. for about 4 minutes. No odor of formaldehyde was apparent. The resulting coated paper was oil and water resistant, free from brittleness and remained porous to the passage of air.

A sample of the 20% resin solution was applied to a steel panel as a 1.5 mil wet film using a draw down bar. It was then baked at 210° C. for 4 minutes. The resulting coated steel panel passed a 3/16" mandrel and had a 3H pencil hardness.

EXAMPLE 2

Urea, 30 g. (0.5 mole), formaldehyde, 59.2 g. (160 g. of 37% aqueous solution, about 1 mole), methanol, 45 g., and 2-amino-2-ethyl-1,3-propanediol (AEPD), 59.5 g. (about 0.5 mole) was charged to a reaction vessel equipped with a stirrer, reflux condenser and thermometer. The mixture was heated at reflux temperature for an hour, with continuous stirring, then dimethylolpropionic acid, 33.5 g., (about 0.25 mole) was added and heating was continued at reflux (about 55°C.) for another hour. The mixture was then neutralized to a pH of about 6.5 with 2-amino-2-ethyl-1,3-propanediol giving a dispersion of resin in aqueous methanol. The color was 3, Gardner, and the viscosity was A.

The solution was diluted to 20% by wt. with methanol and applied to air filter paper by dipping. Excess solution was removed by putting the paper through a roller press. It was then baked at 350° F. for 1½ minutes. No odor of formaldehyde was apparent during the baking step. The resulting coated paper was determined to be particularly suitable for use as filter paper.

EXAMPLE 3

The experiment of Example 1 was repeated in all essential details except that 67 g. of DMPA (about 0.5 mole) was substituted for 1 mole, and 111 g. of butanol was substituted for isopropyl alcohol. After heating at reflux for 2 hours, 98 ml. of the water-butanol azeotrope was separated by distillation over a period of 1.5 hours. The mixture was then cooled and the pH was adjusted to about 6.5 with 2-amino-2-ethyl-1,3-propanediol. There was obtained a 51% by weight dispersion of resin in aqueous butanol. It had a color, Gardner, of 1, a viscosity, Gardner, of G to H, and an acid value of 87. The solution was then diluted to 20% by weight with butanol.

A sample of air filter paper was coated by the procedure of Example 1 and was baked at 350° F. for 15 minutes. No odor of formaldehyde was apparent. The resulting paper had good oil and water resistance, was not brittle and was porous to the passage of air.

EXAMPLE 4

The experiment of Example 2 was repeated in all essential details except 55 g. of butanol was substituted for methanol and 22 g. of acetaldehyde (0.5 mole) was substituted for AEPD.

After the DMPA was added, heating at reflux was continued for another hour, as before, then 63 ml. of butanol-water azeotrope was removed by distillation, and another 126 g. of butanol were added. Heating was continued for 50 minutes and another 126 ml. portion of butanol-water azeotrope was removed by distillation. The reaction mixture was then cooled and the pH was adjusted to about 6 with AEPD. There was obtained a solution of resin in butanol having a Gardner viscosity of A–3, and a Gardner color of 1. It was diluted to 20% with butanol.

A sample of air filter paper was coated with the above product and was baked at 350° F. for 15 minutes. There was no apparent odor of formaldehyde. The coated paper was oil and water-resistant and was non-brittle.

A sample of the coating was applied to steel sufficient to provide a 1.5 mil thickness of wet film, then baked at 350° F. for 15 minutes. The resulting film was clear and colorless and had a 9H pencil hardness. It passed a 1/8" mandrel test.

EXAMPLE 5

The experiment of Example 2 was repeated in all essential details except that isobutyl alcohol was substituted for n-butanol.

After adding the DMPA, heating at reflux was continued for one hour. Then, over a period of 45 minutes, 115 ml. of the isobutyl alcohol-water azeotrope was removed and the resin solution was then cooled. It had a color, Gardner, of 3 and a viscosity of A.

The above reaction mixture was diluted to 20% with isobutyl alcohol and applied to filter paper as before. It was then baked at 350° F. for 2 minutes and produced a water and oil-resistant coating. On steel, it was clear and colorless and had a 9H pencil hardness.

EXAMPLE 6

The experiment of Example 1 was repeated in all essential details except that 90 g. urea (1.5 mole), 25 g. DMPA (about 0.2 mole), 177 g. AEPD (about 1.5 mole) and 1200 g. isopropyl alcohol were used. The mixture was heated under reflux for 45 minutes. The pH was then adjusted to about 6.2 with AEPD and diluted to 20% with isopropyl alcohol. It was determined that it was suitable for use as a paper coating.

EXAMPLE 7

There was delivered to a reaction vessel equipped with a stirring means and a reflux distillation column with take off head, 94 g. phenol (1 mole), 162 g. of 37% HCHO (about 1 mole) and 67 g. DMPA (0.5 mole). The mixture was heated to reflux temperature (about 100° C.) for 4 hours. Then 66 ml. of water and excess formaldehyde were separated by distillation and the mixture was allowed to cool to room temperature. The pH was then adjusted to about 6 with 28.5 g. of 2-amino-2-methyl-1-propanol (AMP). The initial pH before adjustment was about 2. The above solution had a solids content of 87%, color of 3, Gardner scale, a viscosity of U–V, Gardner, and an acid value of about 95.

The solution forms a hard resin when baked and is useful to modify rosin or its derivatives. It is suitable for use in baking enamels for metals.

EXAMPLE 8

The experiment of Example 7 was repeated in all essential details except that 72 g. phenol was substituted for 94 g., and in addition there was added 41 g. t-amyl phenol.

After the reflux period 51 ml. of formaldehyde-water mixture was separated by distillation. After cooling to room temperature, the reaction mixture was neutralized to a pH of 6 by adding 14 g. of AMP. The resulting solution had a solids content of 80.3% by weight, a color, Gardner, of 3, a viscosity, Gardner, of D, and an acid value of 65.9.

A 1.5 ml. of wet film ws applied to steel and baked at 350° F. for 15 minutes. It had a pencil hardness of 2H, and passed a 3/8" mandrel bend test.

EXAMPLE 9

To a reaction vessel equipped with a distillation column, a heat source, an agitation means and a temperature sensing means, there were delivered 75 lb. of urea, 350 lb. of 37% formaldehyde solution, 48 lb. of AEPD, and 21 lb. of DMPA. No additional solvent was added. The mixture was stirred for 15 min. and the ingredients all dissolved readily in the water accompanying the formaldehyde.

The mixture was gradually heated and after about 1 hour the temperature was 193° F. and reflux conditions had become established. After heating under reflux for about 40 minutes, take-off of water was started. Four hours after reflux had started, 120 lb. of water had been removed and the reaction was determined to be complete. The mixture was allowed to cool to ambient temperature and the solids content was determined to be 73.1% by weight. The pH was 5.2.

To the foregoing solution or dispersion there was added 65 lb. AEPD and the resulting pH was 6.8. After standing overnight the pH was 6.0. The resin solution had the following additional properties:

| | |
|---|---|
| Solids, by wt. | 70%. |
| Density | 10 lb./gal. |
| Acid value | 3. |
| Color, Gardner | 2. |
| Viscosity, Gardner | <A. |
| Free formaldehyde | 1.3%. |
| Turbidity | Clear. |
| Odor | None. |
| Solubility in water | Miscible. |
| Water resistance | No odor of formaldehyde after 1 hour in boiling water. |

The resin obtained in the foregoing experiment is used in a process for the manufacture of air filter paper. A portion of the above resin solution is diluted to use concentration by adding a sufficient quantity of water to yield 20% by weight of solids. A piece of paper of the type used for the manufacture of air filters for automobile carburetors is immersed in the diluted resin solution to absorb an excess amount of dispersion, then passed through a pair of rollers to express excess solution. The coated, or impregnated, paper so obtained is allowed to dry. There is no odor of formaldehyde during the drying step.

After drying, the coated paper is crinkled into accordion-type folds by methods known in the art. The crinkled paper is then heated in an oven at 350° F. for about 2.0 minutes. The resulting coated paper is then suitable for use in air filters for carburetors. There is no odor of formaldehyde during the heating step.

EXAMPLE 10

A coated filter paper suitable for use in filtering oil containing particulate matter is prepared by the method of Example 9 using the resin solution of Example 9 except that a grade of paper suitable for filtering oil is substituted for the air filter paper.

EXAMPLE 11

A coated filter paper suitable for use in filtering water containing particulate matter is prepared by the method of Example 9 using the resin solution of Example 9 except that a grade of paper suitable for filtering water is substituted for the air filter paper.

EXAMPLE 12

The pH of an aqueous solution of dimethylol ethylene urea is adjusted to about 6.8 with a 20% aqueous solution of AEPD. A sample of cotton broadcloth fabric is immersed therein until saturated with the solution and is then withdrawn; the excess is removed by pressing between rollers. The treated fabric is then heated to 300° F. for 30 min. There is no odor of formaldehyde in the environment and no discoloration of the fabric.

EXAMPLES 13–36

The experiment of Example 12 is repeated in all essential details except that the compounds listed under the heading "Prepolymer" are substituted for the dimethylol ethylene urea and the compounds listed under "Alkanolamine" are substituted for AEPD, except in those examples where AEPD was used.

| Example No. | Prepolymer | Alkanolamine |
|---|---|---|
| 13 | Dimethylol urea | 2-amino-2-methyl-1,3-propane diol. |
| 14 | Dimethylol-1,3-propylene urea | 2-amino-2-hydroxymethyl-1,3-propanediol. |
| 15 | Bis(hydroxymethyl)tetrahydro-5-ethyl-2-triazone. | 2-amino-2-methyl-1-propanol. |
| 16 | Bis(methoxymethyl) urea | 2-amino-1-ethanol. |
| 17 | Bis(hydroxymethyl) tetrahydro-5-propyl-2-triazone. | AEPD. |
| 18 | 1,3-bis(hydroxymethyl) tetrahydro-2-pyrimidinone. | 2-amino-2-hydroxymethyl-1,3-propanediol. |
| 19 | 1,3-bis(hydroxymethyl) tetrahydro-5-methyl-2-2-pyrimidinone. | 2-amino-1-propanol. |
| 20 | 1,3-bis(hydroxymethyl) tetrahydro-5-hydroxy-2-pyrimidinone. | 2-amino-1-ethanol. |
| 21 | Tetramethylol acetylene diurea. | AEPD. |
| 22 | Tetramethoxymethyl dimethyl acetylene diurea. | 2-amino-1-butanol. |
| 23 | Trimethylol methyl acetylene diurea. | 2-amino-2-methyl-1,3-propanediol. |
| 24 | Tris(methoxymethyl) melamine. | 2-amino-2-methyl-1-propanol. |
| 25 | Hexamethoxymethyl-melamine. | 2-amino-1-butanol. |
| 26 | Tetramethoxymethyl-acetoguanamine. | AEPD. |
| 27 | Phenol-formaldehyde | AEPD. |
| 28 | Cresol-formaldehyde | 2-amino-2-methyl-1,3-propanediol. |
| 29 | Xylenol-formaldehyde | 2-amino-2-hydroxymethyl-1,3-propanediol. |
| 30 | p-Tert-butyl phenol | 2-amino-1-ethanol. |
| 31 | Tributenyl phenol | 2-amino-1-propanol. |
| 32 | p-Phenyl phenol | 2-amino-1-butanol. |
| 33 | Resorcinol | 2-amino-2-methyl-1-propanol. |
| 34 | Hydroquinone | 2-amino-1-hexanol. |
| 35 | Catechol | 2-amino-1-octanol. |
| 36 | 2,2'-bis(hydroxyphenyl)propene. | 2-amino-1-decanol. |

I claim:

1. A heat-curable resin composition effected in an acidic medium and neutralized to a pH within about 5 to 8 with an alkanolamine corresponding to the formula

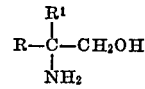

wherein R and $R^1$ are hydrogen, methyl, or ethyl and are the same or different, or R additionally is hydroxymethyl, said resin consisting essentially of the condensation product of dimethylolpropionic acid, a lower aliphatic aldehyde and phenol or an alkyl phenol or mixtures thereof.

2. The resin composition of claim 1 wherein said resin is the condensation product of dimethylolpropionic acid, phenol and formaldehyde wherein the dimethylolpropionic acid is employed in a ratio of about 0.5–1.5 per 2 moles of phenol.

3. The resin composition of claim 1 wherein the pH is within the range of from about 6.0 to about 8.0.

4. A process for the preparation of the composition of claim 1 comprising the steps of (a) reacting dimethylolpropionic acid, formaldehyde and phenol or a mixture of phenol and alkyl phenol in a mole ratio of about 0.5–1.5:2:2 respectively, (b) heating at reflux temperatures of about 100° C. to form said composition, and (c) adjusting the pH to within about 5.0 to 8.0 with an alkylamine or an alkanolamine.

References Cited

Chem. Abstracts, vol. 72, 1970, 68311U, Broecker et al., effective date July 4, 1969, also index page opposite p. 31468.

South African Patent Journal, August 1969, Broecker et al., p. 147.

HOWARD E. SCHAIN, Primary Examiner

U.S. Cl. X.R.

117—132 BF, 139–4, 143 A, 155 L, 161 L; 161—261, 262, 263, 264; 260—29.3, 29.4 R, 33.4 R, 70 R